United States Patent [19]

Kilgore, III

[11] Patent Number: 5,749,687

[45] Date of Patent: May 12, 1998

[54] WALL TOGGLE

[76] Inventor: John C. Kilgore, III, 522 River Rd., Hinckley, Ohio 44233

[21] Appl. No.: 639,334

[22] Filed: Apr. 25, 1996

[51] Int. Cl.[6] .................................................. F16B 21/00
[52] U.S. Cl. .................................................. 411/29; 411/340
[58] Field of Search ............................ 411/21, 22, 29–31, 411/30, 340, 344, 345

[56] References Cited

U.S. PATENT DOCUMENTS

| 1,352,919 | 9/1920 | Salmons | 411/340 |
|---|---|---|---|
| 2,404,169 | 7/1946 | Gidden | 411/340 |
| 2,908,196 | 10/1959 | Apfelzwieg | 411/344 |
| 2,916,235 | 12/1959 | Nagel | 411/340 |
| 3,127,807 | 4/1964 | Modrey | 411/340 |
| 4,285,264 | 8/1981 | Einhorn | 411/345 |
| 5,108,240 | 4/1992 | Leibig | 411/21 |
| 5,160,225 | 11/1992 | Chern | 411/30 |
| 5,226,768 | 7/1993 | Speer | 411/21 |
| 5,449,257 | 9/1995 | Giannuzzi | 411/31 |
| 5,529,449 | 6/1996 | McSherry | 411/31 |

FOREIGN PATENT DOCUMENTS

| 657298 | 1/1965 | Belgium | 411/31 |
|---|---|---|---|
| 1152070 | 5/1969 | United Kingdom | 411/345 |

*Primary Examiner*—Steven N. Meyers
*Assistant Examiner*—Gary Estremsky
*Attorney, Agent, or Firm*—Michael C. Pophal

[57] ABSTRACT

A wall toggle apparatus (10) for securing a threaded fastening member (18) to a wallboard wall (16) including a saw member (12) having an annular body (20). The body has a central passage (22) extending the length of the saw member and interrupted by a threaded external portion (38) having a slot (40) adapted for receiving the threads of the fastening member. The saw member further includes opposed openings (32) extending through the walls of the body. The leading end of the saw member further includes a plurality of teeth (30) for sawing through the wallboard wall. The wall toggle (10) further includes a toggle member (14) which includes a ratchet portion (54) adapted to receive the threads of the fastening member. The toggle member further includes a central hole (60). In operation the saw member is rotated against the face of a wallboard wall sawing into the wall and creating a hole therein. The saw member is further rotated to secure the saw member therein. Once the saw member is secured in the wall the toggle member is inserted into the passage of the saw member and maneuvered to extend between the openings. The fastening member is then inserted into the passage of the saw member and rotated to engage both the slot (40) and the hole (60). Rotation of the fastening member draws the fastening member into the saw member and draws the toggle member into engagement with the back side of the wallboard.

25 Claims, 3 Drawing Sheets

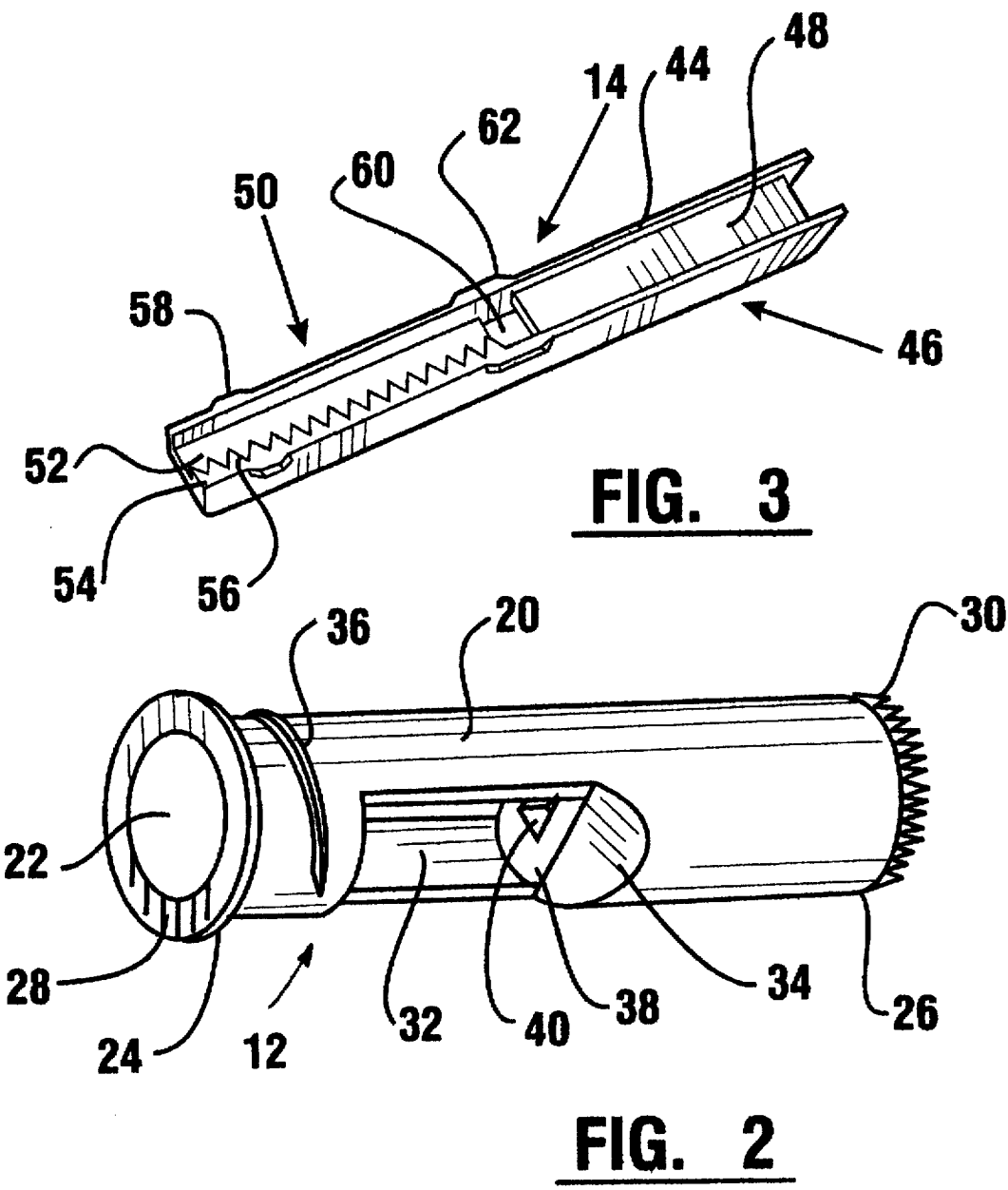

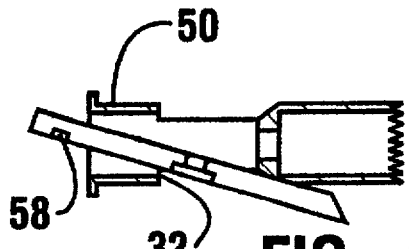
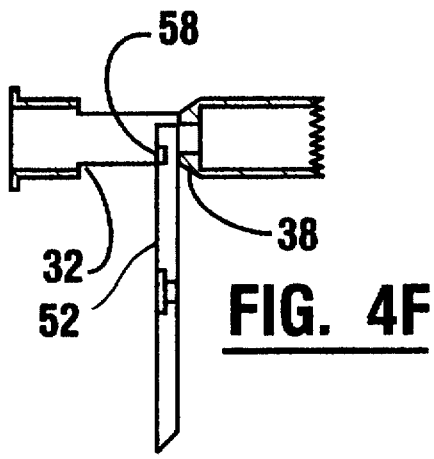
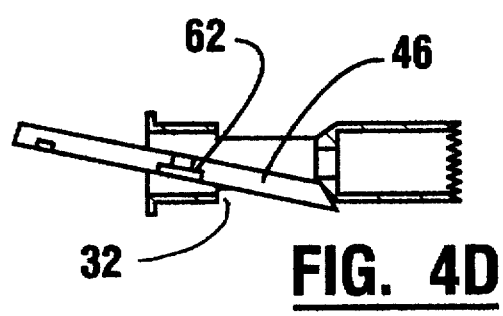
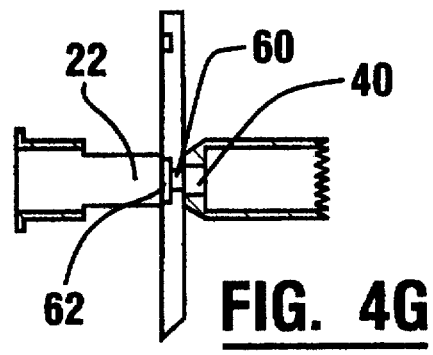
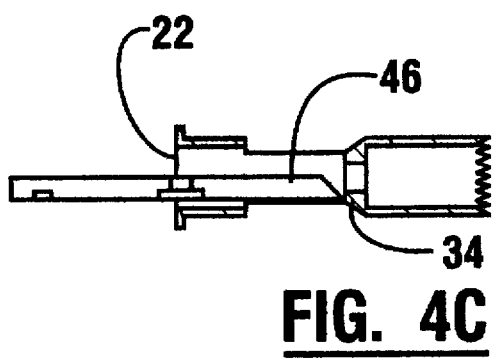
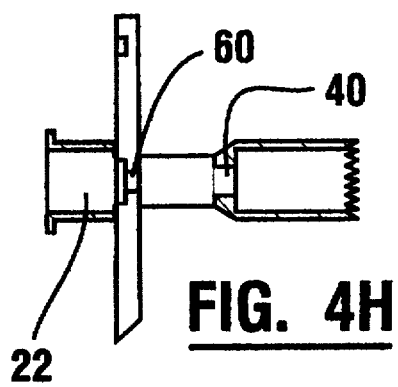
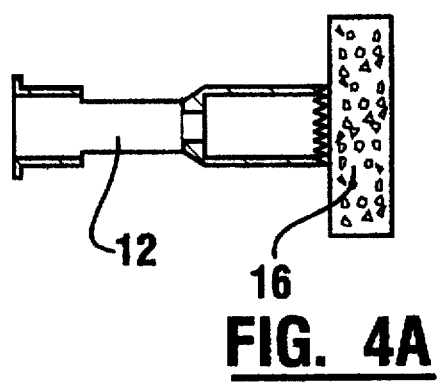

5,749,687

WALL TOGGLE

TECHNICAL FIELD

This invention relates to fasteners, particularly to fasteners for wallboard wall mounting applications.

BACKGROUND ART

Generally screw fasteners cannot be used alone for fastening items to wallboard walls. This is because the threads of the screw can be easily pulled from many types of wallboard. In many types of wallboard, such as sheet rock or press board, wallboard material does not provide a firm gripping substance in which a threaded fastener can be secured. Therefore prior art devices used as wallboard fasteners include wall anchors, toggle bolts and split casing fasteners which do not rely upon threads to secure the fastener. These prior art devices latch onto a back face of the wallboard or outwardly compress the wallboard to secure the fastener.

These prior art devices are installed by first drilling a hole into the wallboard and then inserting the device into the hole. There are several problems with these devices. The drilling requires an appropriately sized drill bit. In addition to a drill, a screw driver or other tool is required to secure the device to the wallboard. The dust from the drill creates a potential health risk and a housekeeping problem. The device often cannot be secured if the hole which is drilled is not the correct diameter. If the hole is not of the proper diameter the fastener may eventually become loose or may disengage from the wallboard.

Thus there exists a need for an apparatus for securing a screw fastener or other type fastener to a wallboard wall in which no separate drilling operation is required, little dust is produced, which requires only one tool for installation and which is easily and reliably secured in the wallboard.

DISCLOSURE OF THE INVENTION

An object of the present invention is to provide an apparatus for securing a screw fastener to a wallboard wall in which no drill and drill bit is required for installation of the apparatus.

A further object of the present invention is to provide an apparatus for securing a screw fastener to a wallboard wall in which little dust is produced during the installation of the apparatus.

A further object of the present invention is to provide an apparatus for securing a screw fastener to a wallboard wall in which only one tool is required for installation of the apparatus.

A further object of the present invention is to provide an apparatus for securing a screw or other type fastener to a wallboard wall which is inexpensive to produce, easy to use and which provides a secure connection to the wallboard wall for the fastener.

Further objects of the present invention will be made apparent from the following Best Modes for Carrying Out Invention and the appended Claims.

The foregoing objects are accomplished in the preferred embodiment of the invention by a wall toggle apparatus for securing a fastening member on a wallboard. The apparatus comprises a generally cylindrical body. The body includes a passage extending in the body between a first opening and a second opening. The first opening is disposed at a first axial end of the body. The second opening comprises a pair of radially opposed openings which extend generally radially through the body. The second openings are axially elongated and axially disposed from the first end. The body further comprises an angled face adjacent each of the openings.

The body has a second axial end opposed of the first axial end. At least one cutting tooth and preferably a plurality of teeth are in operative connection with the second end of the body. Rotation of the body with the teeth in engagement with the wallboard enables the body to cut through the wallboard.

The body includes a tool engaging portion. The tool engaging portion extends in the passage, and is engageable with a tool. The tool engaging portion includes at least one indentation. The indentation is adapted for engagement with the tool. The body is rotatable by the tool, when the tool engages the tool engaging portion.

The body further includes a threaded external portion. The threaded external portion is engageable with the wallboard. Upon rotation of the body in the wallboard, the threaded external portion engages the wallboard to hold the body therein.

The body further includes an annular lip. The lip is supported on the first end of the body. When the body extends in the wallboard the lip engages the wallboard to limit the extent of its inward travel.

The wall toggle apparatus further includes a toggle member. The toggle member comprises a beveled leading edge, and is insertable into the passage. The toggle member is also movably mounted on the body. The toggle member is selectively movable in the passage from the first opening to a projecting position wherein the toggle member extends radially outward from each of the second openings. In the projecting position, the toggle member is engageable with the wallboard to hold the apparatus thereto. The fastening member is engageable with the toggle member to hold the toggle member in the projecting position. The fastening member engages the toggle member and axially moves the toggle member in the projecting position.

The toggle member further includes a pair of outward extending pins which are engageable with the walls of the passage. The toggle member together with the passage comprise a movable interengaging pin and slot, wherein the pin and slot maintain the toggle member in engagement with the body. The pins can engage the walls of the passage when the toggle member is radially extending through one of the second openings.

The toggle member further includes a ratchet portion. The fastening member is engageable with the ratchet portion through the first opening when the toggle member is in the first radially extending position. Movement of the fastening member in engagement with the ratchet portion moves the toggle member from a first radially extending position where the toggle member is radially extending through one of the second openings, to a second radially extending position where the toggle member extends radially outward from each of the second openings.

The toggle member further includes a hole therein adjacent the ratchet portion. When the fastening member engages the hole it moves the toggle member in the axial direction.

The toggle member further includes a medially positioned protruding portion. The protruding portion engages the body when the toggle member is moved through the first opening.

In operation the fastening member is secured on a wallboard by first moving the body in adjacent relation to a front face of the wallboard and placing the tooth in engagement with the front face. The body is then rotated, advancing the body through the wallboard as the tooth cuts through the wallboard until the tooth cuts a hole in the wallboard through which the body is insertable. The body is further rotated, screwing the external threads into the wallboard.

The toggle member is then inserted into the passage in the body. The toggle member is moved through the passage and then through the first opening. When the toggle member is moved into the passage the beveled leading edge of the toggle member engages the angled face of the body. The toggle member is moved through the passage until the protruding portion is in engagement with the walls of the body adjacent the second opening. The toggle member is advanced through the one second opening until the medial protruding portion is moved through the one opening. The toggle member is then positioned in the body to extend radially through the one second opening.

A tool is then inserted into the passage and into engagement with the ratchet portion of the toggle member. The tool is rotated to move the center of the toggle member into centered relation in the passage and through both second openings. The rotation of the tool moves the protruding portion back into the passage and centers the toggle member between the two second openings.

The fastening member is then inserted into the passage and into engagement with the hole in the toggle portion. The fastening member is rotated to move the toggle portion axially and into engagement with a back face of the wallboard. When the fastening member is further rotated, the fastening member advances into the toggle portion. Any suitable device or apparatus supported on the fastening member may be thereby held in fixed connection with the wallboard.

BRIEF DESCRIPTION OF DRAWINGS

A preferred embodiment of the invention, a wall toggle apparatus for securing fasteners to wallboard walls is described hereunder in detail with reference to the accompanying drawings.

FIG. 2 is a perspective view of the saw member of the present invention.

FIG. 3 is a perspective view of the toggle member of the present invention.

FIGS. 4A through 4H show a side cross sectional view of the wall toggle of the present invention in varied positions.

BEST MODES FOR CARRYING OUT INVENTION

Figure 1:
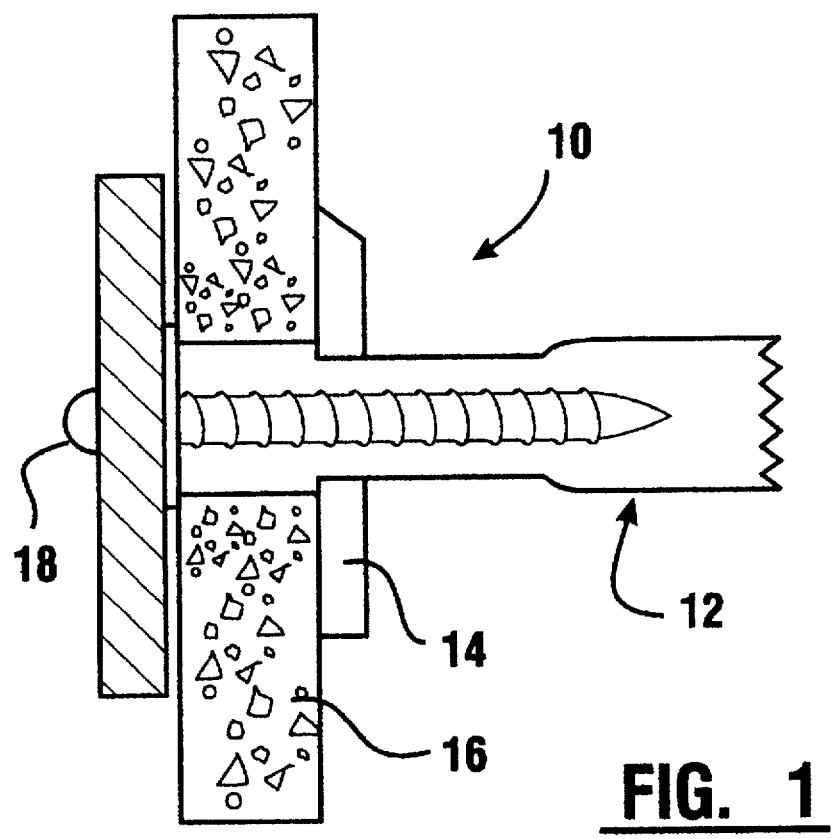
FIG. 1 is a side elevational view of the wall toggle of the present invention shown inserted in a wallboard wall with a screw fastener.

Referring now to the drawings particularly to FIG. 1, a wall toggle apparatus 10 for securing a fastener to a wallboard wall of the present invention is shown. The wall toggle 10 is comprised of two members, a saw member 12 and a toggle member 14. The saw member 12 is shown inserted through a wallboard wall 16. The saw member 12 is holding a fastening member 18 which protrudes from a front face 17 of the wall. The fastening member 18 is extending through both the saw member and the toggle member. The fastening member holds the toggle member 14 against a back face 19 of the wall. The fastening member in the engaged position is usable to hold fixtures, brackets or other devices in releasably supported connection with the wall.

Referring now to FIG. 2, the saw member 12 of the present invention is shown. The saw member 12 comprises an annular body 20. The body has a central passage 22 extending from a first end 24 of the body to a second end 26 along the longitudinal axis of the body. The saw member further includes a lip 28. The lip extends annularly about the surface of the first end 24 generally normal to the longitudinal axis of the body 20. The lip bounds the entry of the passage 22 and extends radially from the body. The lip is adapted for engagement with the front face of the wallboard wall.

The saw member further includes a plurality of teeth 30 extending about the surface of the second end 26. The teeth are arranged in a saw tooth pattern around the circumference of the second end. The length of the teeth preferably are equal to or less than an eighth of an inch long so that rotation of the teeth in the wallboard which comprises the wall can be accomplished with minimal effort by an installer. This tooth length also results in a drilling which is almost dustless. Compared to a drill bit the saw member produces a fraction of wallboard wall dust. The dust volume produced generally moves to the passage 22 and does not leave the circular recess created by the saw member.

The body 20 has two generally rectangular openings 32. Each opening extends axially along the body. Each opening is spaced from the first and second ends. The openings are symmetrical about the longitudinal axis. An end bounding each opening adjacent the first end of the body is spaced from the first end a distance less than the thickness of the wallboard wall. The openings are adapted and arranged on the body so that the toggle member can extend through each opening simultaneously. The body further includes bevelled surfaces 34 adjacent the end of each opening which is near the second end of the body. Each bevelled surface is positioned at an angle extending outward from the passage towards the second end.

The saw member further includes a threaded external portion 36 extending radially outward from the outer surface of the body. The threaded external portion extends helically about the body from the lip 28 to the openings 32. The threaded external portion is adapted to engage the wallboard wall when the saw member is rotated in the wallboard board.

The saw member further includes a tool engaging portion 38 extending in the passage 22 between the bevelled surfaces 34. The tool engaging portion 38 extends generally normal to the longitudinal axis. The tool engaging portion includes a slot 40 centrally positioned therein. The slot is generally aligned with the longitudinal axis. The slot is also adapted to accept the threads of the fastening member. In the preferred embodiment of the invention the slot is adapted to accept the ridges of the tip of a Phillips screw driver. In alternative embodiments of the invention slots, ridges or projections can be used to fit other screw driver tips or other tool shapes.

In the preferred embodiment of the invention the saw member is manufactured from metal. In alternative embodiments of the invention the saw member is manufactured from a rigid plastic. The plastic saw member is capable of scoring the front face of the wallboard and removing material from the wallboard when it is rotated.

Referring now to FIG. 3, the toggle member 14 of the present invention is shown. The toggle member is generally planar and sized in cross section to be insertable in the passage and through the openings of the saw member. The toggle member 14 includes two generally parallel walls 44. The ends of the walls are bevelled at a leading half 46 of the toggle member. The leading half 46 includes a shelf 48 extending between the walls, adjoining the interior faces of the walls at their mid point.

The toggle member further includes a trailing half 50. The trailing half 50 includes a guide 52 extending between the walls. The guide 52 joins the interior faces of each wall at an edge of each wall. The trailing half further includes a ratchet portion 54 comprising a plurality of jaws 56 extending along the length of the interior face of one of the walls. The jaws 56 of the ratchet portion 54 are preferably spaced for acceptance of the ridges of the tip of a Phillips screw driver. Rotation of the screw driver while in engagement with the ratchet portion moves the toggle member laterally.

The trailing half further includes a pair of opposed pins 58. The pins extend from the exterior face of the walls. The pins are positioned on the walls medially along the length of the trailing half. In the alternative embodiment of the plastic saw portion, the pins are eliminated from the toggle member for the reasons discussed below.

The toggle member 14 further includes a rectangular hole 60 positioned between the guide 52 and the shelf 48. The hole is adapted for acceptance of the threads of the fastening member. The toggle member further includes a pair of opposed protruding portions 62 extending from the exterior faces of the wall. The protruding portions protrude from the walls and are positioned medially on the toggle member and adjacent the hole 60. In the alternative embodiment of the plastic saw portion, the protruding portions are eliminated from the toggle member for the reasons discussed below.

The toggle member 14 of the preferred embodiment is comprised of metal material. The particular type of metal used is preferably strong enough to withstand the shearing forces associated with the rotation of a Phillips screw head. Alternatively, the toggle member can be comprised of plastic materials.

Figure 4B:
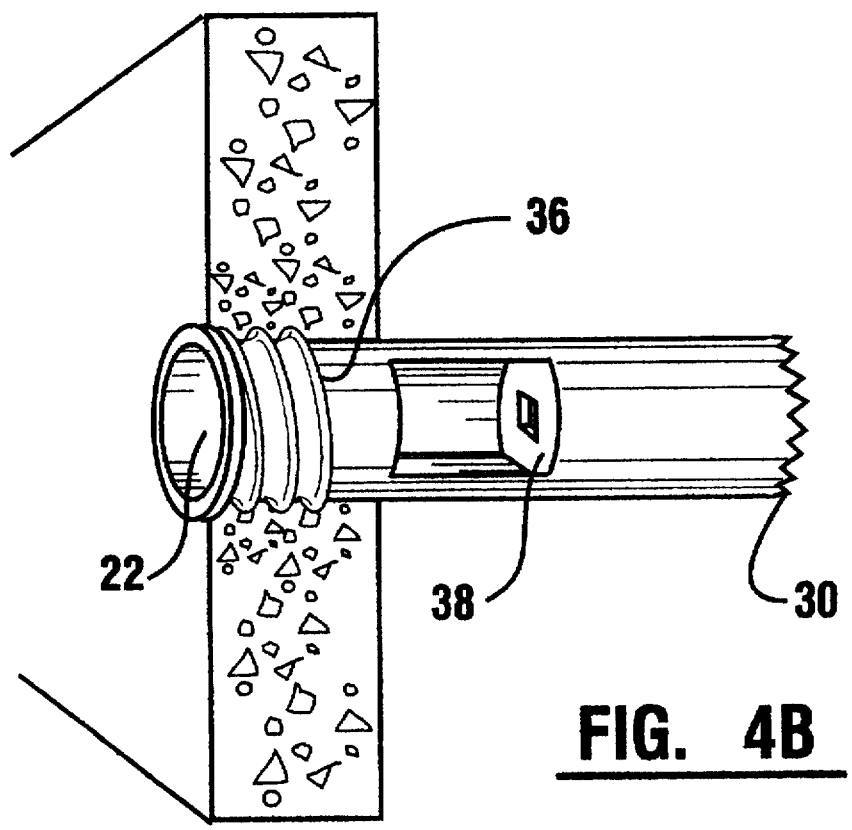

Referring now to FIGS. 4A through 4H, the operation of the preferred embodiment of the present invention will be described. The saw member 12 is initially positioned against the wallboard wall with the teeth 30 in engagement with the front face of the wallboard wall. This position is shown in FIG. 4A.

Once in position, a screw driver with a Phillips head tip is inserted into the passage 22 and into engagement with the slot 40. The screw driver is rotated causing the rotation of the saw member 12. The rotation of the saw member 12 moves the teeth 30 against the surface of the wallboard removing material from the wallboard to create a circular bore. The wallboard material which is removed stays within the circular bore.

The rotation of the screw driver is continued, causing the teeth to saw into the wallboard. Rotation of the screw driver is continued while the teeth saw completely through the wallboard, cutting a circular plug from the wall. Rotation of the saw member is continued and the threaded external portion engages into the wall, securing the saw member in the wall in a position generally normal thereto. This position is shown in FIG. 4B. In this position, the lip 28 is flush and in engagement with the exterior face of the wall. The saw member is now ready for the insertion of the toggle member.

The leading half 46 of the toggle member is inserted into the passage 22 until the bevelled end engages the bevelled surface 34 of the saw member. This position is shown in FIG. 4C.

Referring now to FIG. 4D, the toggle member is manipulated so that the leading half 46 protrudes from one opening 32. The leading half is moved through the opening until the protruding portions 62 are in engagement with the walls of the opening 32.

Referring now to FIGS. 4E and 4F, force is applied to the trailing half 50 of the toggle member until the protruding portions 62 are pushed through the opening 32. The trailing half 50 of the toggle member is pushed into the passage with the pins 58 remaining within the passage. The engagement of the pins with the walls of the passage prevent the toggle member from falling out of the saw member.

A screw driver with a Phillips head tip is inserted into the passage and into engagement with the guide 52. The screw driver pushes the toggle member against the tool engaging portion 38 and into the position shown in FIG. 4F. FIG. 4F shows the toggle member in a first radially extending position in which the leading half of the toggle member is extending through an opening and the toggle member is positioned generally normal to the longitudinal axis of the saw member.

The Phillips head tip is kept in engagement with the guide 52 while the Phillips screw driver is rotated. Rotation of the screw driver causes alternative engagement of the ridges of the screw driver with the jaws of the ratchet portion 54. The rotation moves the center of the toggle member towards a centered position with respect to the saw member until the protruding portions are forced back within the passage 22 and the hole 60 is aligned with the slot 40 as shown in FIG. 4G. FIG. 4G shows the toggle member in a second radially extending position in which both ends of the toggle member extend through the opposed openings in the saw member.

A fastening member is then inserted into the passage 22 and threaded through the hole 60 in the toggle member. The fastening member is rotated and the threads of the fastening member engages the hole 60 and moves the toggle member axially forward in the longitudinal direction and into engagement with the back side of the wallboard wall.

In this position the fastening member may be used to hold brackets, fixtures or other devices in engagement with the wall. The engagement of the toggle member with a wide area of the wallboard gives the wall toggle of the present invention excellent strength.

Of course, metal washers or other conventional fastening hardware can be used with the fastening member and interposed between the head of the fastening member and the lip 28. The wall toggle of the invention is also rapidly installed. The Phillips screw driver can be manually rotated, or for more rapid installation a Phillips drill bit in association with an electric drill or electric screw driver can be used.

In the operation of the alternative embodiment of the present invention comprising the plastic saw member, the openings of the saw member are sized in width to be slightly smaller than the width of the toggle member. This fit between the opening and the toggle member allows the opening to hold the toggle member within the opening thus eliminating the need for the pins and the protruding portions.

The alternative embodiment operates in the same manner as the above described operation of the preferred embodiment. When the leading half of the toggle member is inserted through the opening the walls of the opening deflect to allow the passage of the toggle member through the opening. When the toggle member is in the first and second radially extending positions the walls of the opening clamp onto the toggle member to hold the toggle member securely.

Thus the invention achieves the above stated objectives, eliminates difficulties encountered in the use of prior devices, solves problems and attains the desirable results described herein.

In the foregoing description certain terms have been used for brevity, clarity, and understanding. However, no unnecessary limitations can be implied therefrom because such terms are used for descriptive purposes and are intended to be broadly construed. Moreover, the description and illustrations given are by way of examples and the invention is not limited to the exact details shown or described.

Having described the features, discoveries and principles of the invention, the manner in which it is constructed and the advantages and useful results obtained; the new and useful structures, devices, elements, arrangements, parts, combinations, systems, equipment, operations and relationships set forth in the appended claims.

I claim:

1. A wall toggle apparatus for securing a fastening member on a wallboard, comprising:
   a generally cylindrical body, said body including a passage extending in said body between a first opening and a second opening, wherein said first opening is disposed at a first axial end of said body, and wherein said second opening comprises a pair of radially opposed second openings through said body, said second opening axially disposed from said first end, wherein said body comprises a second axial end opposed of said first axial end, and further comprising at least one cutting tooth in operative connection with said second end, whereby rotation of said body enables said body to cut through said wallboard;
   a toggle member, wherein said toggle member is movably mounted on said body and wherein said toggle member is selectively movable in said passage to a projecting position wherein said toggle member extends radially outward from said second opening, whereby in said projecting position said toggle member is engageable with said wallboard to hold said fastening member therein,
   wherein said toggle member is moveable in said passage from a generally axially extending position to a first generally radially extending position wherein said toggle member extends radially from one of said second openings in said pair, and wherein said toggle member is movable to a second radially extending position wherein said toggle portion extends radially outward from each of said second openings in said pair.
   wherein said toggle member further comprises a ratchet means for engaging with a tool through said first opening to move said toggle member from the first radially extending position to the second radially extending position when said tool is engaged therewith and rotated.

2. The apparatus according to claim 1, wherein said fastening member is engageable with said toggle member to hold said toggle member in said projecting position.

3. The apparatus according to claim 2, wherein said second opening is axially elongated and wherein said toggle member is engageable with said fastening member and whereby when said fastening member is rotated said fastening member is operative to axially move said toggle member in the projecting position.

4. The apparatus according to claim 1, wherein said tool is a screwdriver wherein said ratchet means comprises a plurality of linearly arranged teeth, wherein said teeth are arranged to be engagable by the tip of said screwdriver, whereby when said screwdriver is rotated said tip engages adjacent teeth in succession moving said toggle member towards the second radially extending position.

5. The apparatus according to claim 1, wherein each of said openings in said pair is axially elongated, and further comprising a fastening member, wherein said fastening member engages said toggle member and axially moves said toggle member in the projecting position.

6. The apparatus according to claim 5, wherein said toggle member is movable through said passage from said first opening to said projecting position.

7. The apparatus according to claim 1, and wherein said toggle member and said passage comprise a movable interengaging pin and slot, wherein said pin and slot maintain said toggle member in engagement with said body.

8. The apparatus according to claim 6, wherein said toggle member and said body comprise an interengaging movable pin and slot, and wherein said pin and slot hold said toggle member in connection with said body in the first radially extending position.

9. The apparatus according to claim 5, wherein each of said second openings are axially elongated and wherein rotation of said fastening member axially moves said toggle member in the second radially extending position.

10. The apparatus according to claim 1, wherein said toggle member comprises a hole therein adjacent said ratchet means and wherein said fastening member engages said hole to move said toggle member in the axial direction.

11. A wall toggle apparatus for securing a component on a wallboard, comprising:
   a generally annular body, said body including a passage extending in said body between a first end and a second end, wherein said body further includes a first radially extending opening in communication with said passage said first opening being axially disposed between said first and second ends;
   said body further including a tool engaging portion, said tool engaging portion extending in said passage, whereby said tool engaging portion is engageable with a tool, and said body is rotatable by said tool;
   at least one cutting tooth in operative connection with said second end of said body; whereby rotation of said body enables said apparatus to cut through said wallboard;
   toggle member, wherein said toggle member is movable in said first opening and said passage, and wherein said toggle member is movable to a projecting position wherein said toggle member extends radially through said first opening, whereby said toggle member is engageable with said wallboard, wherein said toggle member further includes a ratchet means for engaging with a tool to move said toggle member radially in said first opening.

12. The apparatus according to claim 11, wherein said tool engaging portion includes at least one indentation, wherein said indentation is adapted for engagement with said tool.

13. The apparatus according to claim 11, wherein said body further includes a threaded external portion, said threaded external portion being engageable with said wallboard, whereby upon rotation of said body in said wallboard said threaded external portion engages said wallboard to hold said body therein.

14. The apparatus according to claim 11, wherein said body further includes an annular lip, said lip supported on said first end of said body, whereby when said body extends in said wallboard said lip engages said wallboard.

15. The apparatus according to claim 11, further comprising a fastening member, wherein said fastening member is engageable with said toggle member to hold said toggle member in the projecting position.

16. The apparatus according to claim 11, wherein said toggle member further includes a protruding portion, wherein said protruding portion engages said body when said toggle member is moved through said first opening.

17. A method of securing a fastening member on a wallboard with an apparatus, wherein said apparatus comprises a generally cylindrical body, said body including a passage in said body between a first end and a second end, wherein said apparatus further comprises at least one cutting tooth in operative connection with said second end, wherein said body comprises a pair of radially opposed openings, said openings being in communication with said passage, wherein said apparatus further comprises a toggle member, wherein said toggle member comprises a ratchet portion, comprising the steps of:

moving said body in adjacent relation to a front face of said wallboard and placing said tooth in engagement with said front face;

rotating said body and advancing said body through said wallboard as said tooth cuts through said wallboard until said tooth cuts a hole in said wallboard through which said body is insertable;

inserting said toggle member into said passage; inserting a tool into said passage and into engagement with said ratchet portion; rotating said tool to move the center of said toggle member towards said passage and through both openings.

18. The method of claim 17 wherein said body further comprises a threaded external portion extending on the exterior surface of said body, further comprising the step of:

screwing said threaded external portion into said wallboard by further rotating said body.

19. The method of claim 17, further comprising the step of: moving said toggle member through said passage and through one of said openings.

20. The method of claim 19 wherein said body comprises an angled face adjacent each said opening, and said toggle member comprises a beveled leading edge, wherein in said moving said toggle member step said beveled leading edge of said toggle member is moved through said passage into engagement with an angled face of said body.

21. The method of claim 19 wherein said toggle portion further comprises a medially positioned protruding portion, wherein in said moving said toggle member step, said toggle member is moved through said opening until said protruding portion is in engagement with the walls of said body adjacent said opening.

22. The method of claim 21 further comprising the step of:

advancing said toggle member through said opening until said medial protruding portion is moved through said opening.

23. The method of claim 19, further comprising the step of positioning said toggle member in said body to extend radially through said opening.

24. The method of claim 17, wherein said toggle member further comprises a hole, further comprising the steps of:

inserting said fastening member into said passage and into engagement with said hole of said toggle portion;

rotating said fastening member to move said toggle portion axially and into engagement with a back face of said wallboard.

25. A method for securing a fastening member to a wallboard, comprising the steps of:

moving a body through a wallboard, wherein said wallboard has a front face and a back face and wherein said body has a passage therein, said passage having a first opening adjacent said front face and a second opening adjacent said back face;

moving a toggle member through said passage, wherein said toggle member is moved in said first opening and is extended radially outward from said second opening;

moving a tool through said passage and into engagement with a ratchet portion of said toggle member, and rotating said tool to move said toggle member centrally within said body; and engaging said toggle member with a fastening member wherein said fastening member moves said toggle member to engage said back face.

\* \* \* \* \*